(12) United States Patent
Yonezawa et al.

(10) Patent No.: US 11,427,178 B2
(45) Date of Patent: Aug. 30, 2022

(54) HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 16/811,373

(22) Filed: Mar. 6, 2020

(65) Prior Publication Data
US 2020/0298823 A1 Sep. 24, 2020

(30) Foreign Application Priority Data

Mar. 20, 2019 (JP) .............................. JP2019-053079

(51) Int. Cl.
  *B60W 20/10* (2016.01)
  *B60K 6/24* (2007.10)
  *B60K 6/365* (2007.10)
  *B60W 10/06* (2006.01)
  *B60W 10/08* (2006.01)
  *B60K 6/26* (2007.10)

(52) U.S. Cl.
CPC ............ *B60W 20/10* (2013.01); *B60K 6/24* (2013.01); *B60K 6/365* (2013.01); *B60W 10/06* (2013.01); *B60W 10/08* (2013.01); *B60K 6/26* (2013.01); *B60W 2510/0657* (2013.01); *B60W 2510/081* (2013.01); *B60W 2710/0666* (2013.01); *B60Y 2200/92* (2013.01); *B60Y 2400/435* (2013.01)

(58) Field of Classification Search
None
See application file for complete search history.

(56) References Cited

U.S. PATENT DOCUMENTS 10,576,960 B2 * 3/2020 Shin ......................... B60K 6/48

FOREIGN PATENT DOCUMENTS

| JP | 2002159105 A | * | 5/2002 |
| JP | 2006009942 A | * | 1/2006 |
| JP | 3777975 B2 | * | 5/2006 |
| JP | 3777975 B2 | | 5/2006 |
| JP | 2006-144625 A | | 6/2006 |
| JP | 4085598 B2 | * | 5/2008 |

(Continued)

*Primary Examiner* — Dirk Wright
(74) *Attorney, Agent, or Firm* — Sughrue Mion, PLLC (57) ABSTRACT

An HV-ECU calculates requested output torque Tec based on requested power and compares the requested output torque with controlled upper limit torque Teth. When requested output torque Tec has attained to controlled upper limit torque Teth, the HV-ECU restricts output torque of engine to controlled upper limit torque Teth and calculates actual output torque Ter at that time. Then, the HV-ECU calculates a difference (differential torque ΔTe) between controlled upper limit torque Teth and actual output torque Ter. The HV-ECU learns controlled upper limit torque Teth based on differential torque ΔTe.

7 Claims, 8 Drawing Sheets

(56) References Cited

FOREIGN PATENT DOCUMENTS

| | | | |
|---|---|---|---|
| JP | 2010-64599 A | | 3/2010 |
| JP | 2011251615 A | * | 12/2011 |
| JP | 2012179955 A | * | 9/2012 |
| JP | 5050826 B2 | * | 10/2012 |
| JP | 2014058217 A | * | 4/2014 |
| JP | 2015-058924 A | | 3/2015 |
| JP | 2015-107685 A | | 6/2015 |
| KR | 101765538 B1 | * | 8/2017 |

* cited by examiner

HYBRID VEHICLE

This nonprovisional application is based on Japanese Patent Application No. 2019-053079 filed with the Japan Patent Office on Mar. 20, 2019, the entire contents of which are hereby incorporated by reference.

BACKGROUND

Field

The present disclosure relates to a hybrid vehicle.

Description of the Background Art

Japanese Patent Laying-Open No. 2015-58924 discloses a hybrid vehicle including an internal combustion engine, a motor generator, and a planetary gear mechanism. The internal combustion engine, the motor generator, and an output shaft are connected to the planetary gear mechanism.

SUMMARY

In the hybrid vehicle including the planetary gear mechanism as disclosed in Japanese Patent Laying-Open No. 2015-58924, in order to apply output torque of the internal combustion engine to a drive wheel, the motor generator outputs reaction torque against output torque of the internal combustion engine. When output torque of the internal combustion engine increases and reaction torque necessary for bearing output torque of the internal combustion engine exceeds maximum output torque of the motor generator, reaction torque of the motor generator can no longer bear output torque of the internal combustion engine and over-rotation of the motor generator may occur. In order to prevent this, an upper limit for control purpose (which is also referred to as "controlled upper limit torque" below) may be set for output torque of the internal combustion engine.

Controlled upper limit torque may be set to a value around output torque in accordance with maximum output torque of the motor generator (which is also referred to as "threshold output torque" below) such that the internal combustion engine can output high output torque when requested. In this case, for example, due to detection errors of various sensors and variation in operation among actuators (which are also collectively referred to as "detection variation" below), actual output torque actually output from the internal combustion engine may unintentionally exceed controlled upper limit torque and further exceed threshold output torque. Then, over-rotation of the motor generator may occur.

When controlled upper limit torque is set with a prescribed margin being secured for threshold output torque, output torque of the internal combustion engine is excessively restricted by setting of low controlled upper limit torque, which may affect running of the hybrid vehicle or drivability.

It has been desired to appropriately set controlled upper limit torque while moderately balancing between ability of output of high output torque from the internal combustion engine when requested and prevention of over-rotation of a rotating electric machine.

The present disclosure was made to solve the problem above, and an object thereof is to appropriately set controlled upper limit torque that is set as an upper limit for a purpose of control of output torque of an internal combustion engine.

(1) A hybrid vehicle according to the disclosure includes an internal combustion engine, a rotating electric machine, a planetary gear mechanism to which the internal combustion engine, the rotating electric machine, and an output shaft are connected, and a controller that controls the internal combustion engine and the rotating electric machine. When requested output torque calculated based on requested power requested of the internal combustion engine has attained to controlled upper limit torque representing an upper limit for a purpose of control of output torque of the internal combustion engine, the controller restricts output torque of the internal combustion engine to controlled upper limit torque or smaller, calculates actual output torque of the internal combustion engine based on output torque of the rotating electric machine or variation in rotation speed of the rotating electric machine, and learns controlled upper limit torque based on a difference between controlled upper limit torque and actual output torque.

According to the configuration, when calculated requested output torque has attained to controlled upper limit torque, output torque of the internal combustion engine is restricted to controlled upper limit torque, and actual output torque of the internal combustion engine is calculated based on output torque of the rotating electric machine at that time or variation in rotation speed of the rotating electric machine. By calculating actual output torque of the internal combustion engine, deviation between a target value (controlled upper limit torque) of output torque of the internal combustion engine in that case and actual output torque actually output from the internal combustion engine can be calculated. This deviation is assumed as being attributed to detection variation. By learning controlled upper limit torque based on the deviation (a difference between controlled upper limit torque and actual output torque), controlled upper limit torque in consideration of detection variation can appropriately be set.

(2) In one embodiment, when actual output torque is larger than controlled upper limit torque, the controller learns controlled upper limit torque to decrease controlled upper limit torque. When actual output torque is smaller than controlled upper limit torque, the controller learns controlled upper limit torque to increase controlled upper limit torque.

When actual output torque is larger than controlled upper limit torque set as the target value due to detection variation, by learning controlled upper limit torque to decrease the same, actual output torque exceeding threshold output torque due to detection variation can be suppressed. When actual output torque is smaller than controlled upper limit torque set as the target value due to detection variation, by learning controlled upper limit torque to increase the same, originally requested output torque can be output.

(3) In one embodiment, an initial value of controlled upper limit torque is set to output torque of the internal combustion engine in accordance with maximum output torque of the rotating electric machine.

According to the configuration, output torque (threshold output torque) in accordance with maximum output torque of the rotating electric machine is set as an initial value (for example, a value at the time of shipment of hybrid vehicles from factories) of controlled upper limit torque. Thus, controlled upper limit torque can appropriately be set by learning while high output torque can be output from the internal combustion engine when requested in an initial stage.

(4) In one embodiment, when actual output torque exceeds output torque corresponding to maximum output torque of the rotating electric machine, the controller controls output torque of the internal combustion engine to decrease.

Examples of control of output torque of the internal combustion engine to decrease include control for retarding ignition of the internal combustion engine, timing control of a variable valve, control of a throttle valve, and control for cutting off fuel. By controlling output torque of the internal combustion engine to decrease, output torque of the internal combustion engine can be decreased and over-rotation of the rotating electric machine can be suppressed.

(5) In one embodiment, the internal combustion engine includes a forced induction device.

An internal combustion engine including a forced induction device includes a larger number of sensors or actuators than an internal combustion engine without a forced induction device. Therefore, such an internal combustion engine is assumed to be greater in detection variation than the internal combustion engine without a forced induction device. In the internal combustion engine including a forced induction device, actual output torque thereof is assumed to exceed threshold output torque due to detection variation more often than in the internal combustion engine without a forced induction device. Therefore, the present disclosure can suitably be applied to the hybrid vehicle including the internal combustion engine including the forced induction device.

(6) In one embodiment, when a temperature of cooling water for the internal combustion engine is lower than a reference temperature, controlled upper limit torque is set to a prescribed value smaller than output torque in accordance with maximum output torque of the rotating electric machine.

The prescribed value is set, for example, to a value smaller than output torque (threshold output torque) in accordance with maximum output torque of the rotating electric machine, by at least a maximum value of detection variation assumed before completion of warm-up of the internal combustion engine. Thus, output torque of the internal combustion engine exceeding threshold output torque due to detection variation under such a condition that accuracy in output until the internal combustion engine is warmed up is low can be suppressed.

(7) One embodiment includes an internal combustion engine, a rotating electric machine, a planetary gear mechanism to which the internal combustion engine, the rotating electric machine, and an output shaft are connected, and a controller that controls the internal combustion engine and the rotating electric machine. A condition that requested output torque calculated based on requested power requested of the internal combustion engine has attained to controlled upper limit torque representing an upper limit for a purpose of control of output torque of the internal combustion engine is defined as a learning condition. When the learning condition is satisfied, the controller restricts output torque of the internal combustion engine to controlled upper limit torque or smaller, and calculates actual output torque of the internal combustion engine based on output torque of the rotating electric machine or variation in rotation speed of the rotating electric machine and learns a difference between controlled upper limit torque and actual output torque. When the learning condition is satisfied next time, the controller controls output torque of the internal combustion engine based on the learned difference.

According to the configuration, when calculated requested output torque has attained to controlled upper limit torque, a difference between controlled upper limit torque and actual output torque is learned. Specifically, when calculated requested output torque has attained to controlled upper limit torque, the controller restricts output torque of the internal combustion engine to controlled upper limit torque, calculates actual output torque of the internal combustion engine based on output torque of the rotating electric machine at that time or variation in rotation speed of the rotating electric machine, and learns a difference between controlled upper limit torque representing a target value and actual output torque. This difference is assumed as being attributed to detection variation. Then, in restricting output torque of the internal combustion engine to controlled upper limit torque when requested output torque calculated next time has attained to controlled upper limit torque, the controller controls output torque of the internal combustion engine based on the difference learned in previous learning. Variation in actual output torque of the internal combustion engine due to detection variation can thus be suppressed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

First Embodiment

<Overall Configuration>

Figure 1:
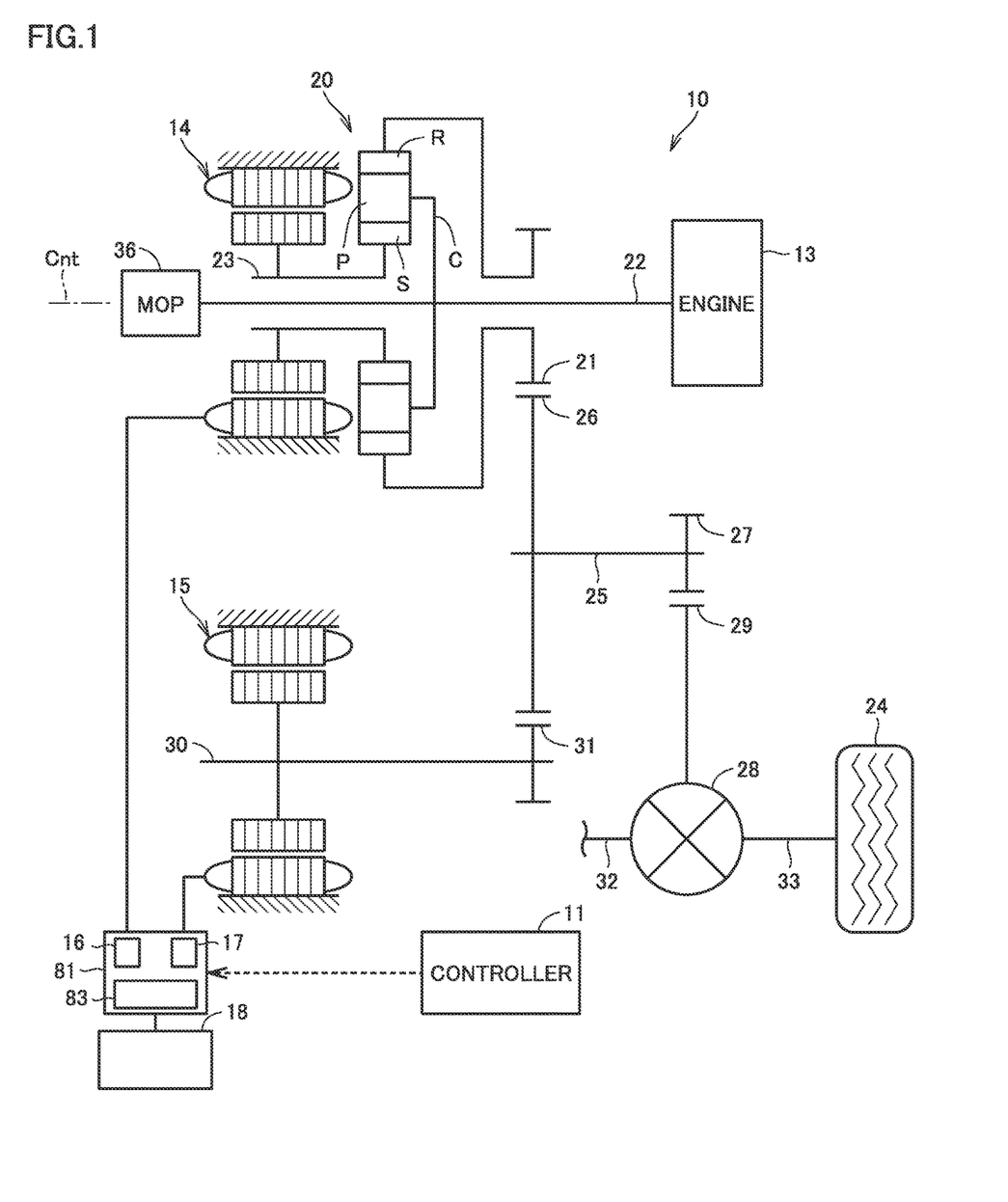
FIG. 1 is an overall configuration diagram showing an exemplary hybrid vehicle according to a first embodiment.

FIG. 1 is an overall configuration diagram showing an exemplary hybrid vehicle according to a first embodiment. Referring to FIG. 1, this hybrid vehicle (which is also simply referred to as a "vehicle" below) 10 includes a controller 11, an engine 13, a first motor generator (which is also referred to as a "first MG" below) 14, a second motor generator (which is also referred to as a "second MG" below) 15, and a planetary gear mechanism 20.

First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a power storage 18 with a power control unit (PCU) 81 being interposed. PCU 81 includes a first inverter 16 that supplies and receives electric power to and from first MG 14, a second inverter 17 that supplies and receives electric power to and from second MG 15, and a converter 83.

Converter 83 supplies and receives electric power to and from power storage 18 as well as first inverter 16 and second inverter 17. For example, converter 83 can up-convert electric power from power storage 18 and supply up-converted electric power to first inverter 16 or second inverter 17. Alternatively, converter 83 can down-convert electric power supplied from first inverter 16 or second inverter 17 and supply down-converted electric power to power storage 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges power storage 18 with electric power generated by first MG 14 or second MG 15 or drives first MG 14 or second MG 15 with electric power from power storage 18.

Power storage 18 is mounted on vehicle 10 as a drive power supply (that is, a motive power source) of vehicle 10. Power storage 18 includes a plurality of stacked batteries. Examples of the battery include secondary batteries such as a nickel metal hydride battery and a lithium ion battery. The battery may be a battery containing a liquid electrolyte between a positive electrode and a negative electrode or a battery containing a solid electrolyte (an all-solid-state battery). Power storage 18 should only be a rechargeable DC power supply, and a large-capacity capacitor can also be adopted.

Engine 13 and first MG 14 are coupled to planetary gear mechanism 20. Planetary gear mechanism 20 transmits output torque of engine 13 by dividing output torque into output torque to first MG 14 and output torque to an output gear 21. Planetary gear mechanism 20 includes, for example, a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Engine 13 has output shaft 22 coupled to carrier C. A rotor shaft 23 of first MG 14 is coupled to sun gear S. Ring gear R is coupled to output gear 21.

Carrier C to which output torque of engine 13 is transmitted functions as an input element, ring gear R that outputs torque to output gear 21 functions as an output element, and sun gear S to which rotor shaft 23 of first MG 14 is coupled functions as a reaction force element. Namely, planetary gear mechanism 20 divides output from engine 13 into output on a side of first MG 14 and output on a side of output gear 21. First MG 14 is controlled to output torque in accordance with output torque of engine 13.

A countershaft 25 is arranged in parallel to axis Cnt. Countershaft 25 is provided with a driven gear 26 meshed with output gear 21. A drive gear 27 is further provided in countershaft 25, and drive gear 27 is meshed with a ring gear 29 in a differential gear 28. A drive gear 31 provided in a rotor shaft 30 of second MG 15 is meshed with driven gear 26. Therefore, output torque of second MG 15 is added to torque output from output gear 21 in driven gear 26. Torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is also referred to as an "MOP" below) 36 is provided coaxially with output shaft 22 of engine 13. MOP 36 delivers lubricating oil with a cooling function, for example, to planetary gear mechanism 20, first MG 14, second MG 15, and differential gear 28.

<Configuration of Engine>

Figure 2:
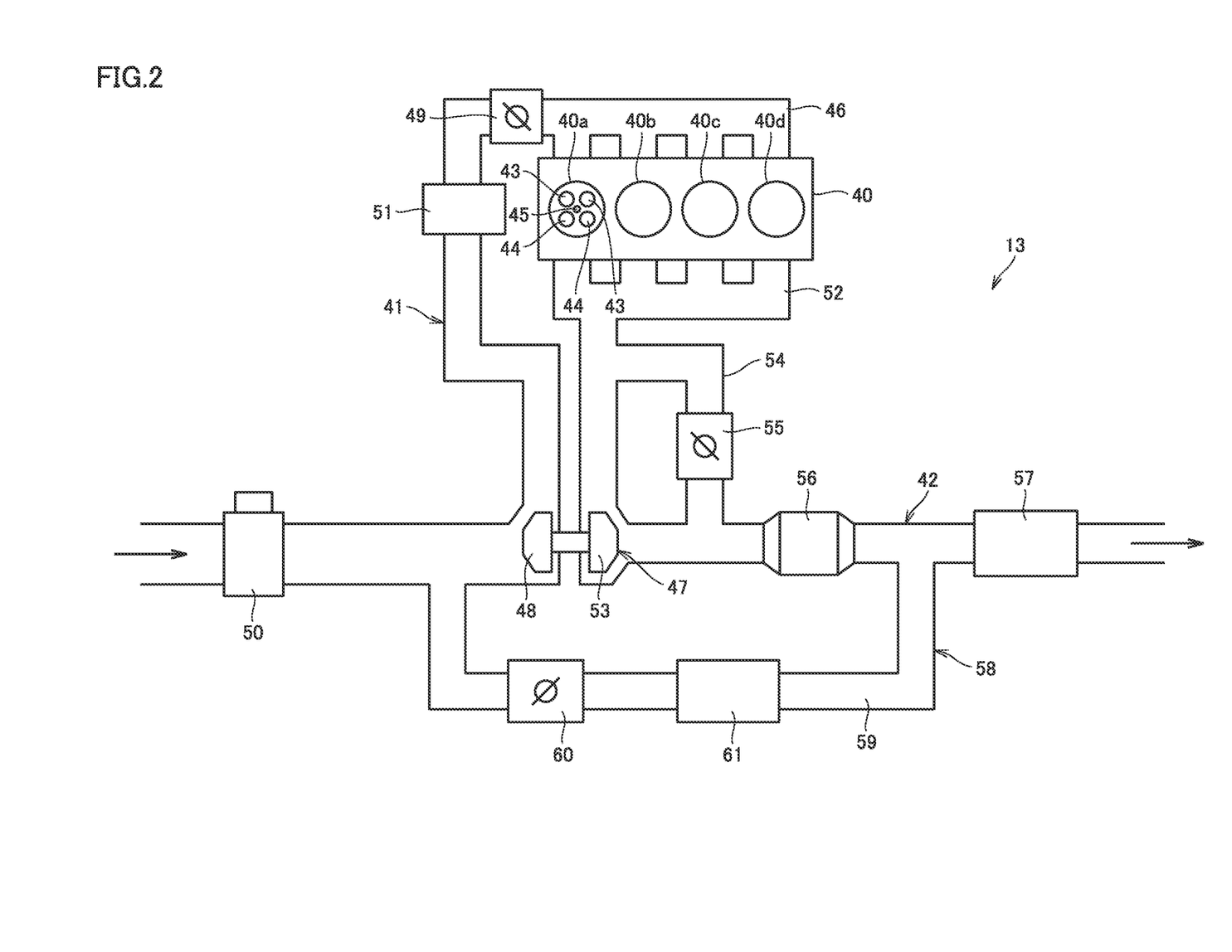
FIG. 2 is a diagram showing an exemplary configuration of an engine.

FIG. 2 is a diagram showing an exemplary configuration of engine 13. Referring to FIG. 2, engine 13 is, for example, an in-line four-cylinder spark ignition internal combustion engine including, for example, a forced induction device 47. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d. One end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

Engine 13 according to the first embodiment is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with forced induction device 47 that uses exhaust energy to boost suctioned air. Forced induction device 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and intake manifold 46.

An exhaust passage 42 has one end connected to exhaust manifold 52 and the other end connected to a muffler (not shown). Turbine 53 is provided at a prescribed position in exhaust passage 42. In exhaust passage 42, a bypass passage 54 that bypasses exhaust upstream from turbine 53 to a portion downstream from turbine 53 and a waste gate valve 55 provided in the bypass passage and capable of regulating a flow rate of exhaust guided to turbine 53 are provided. Therefore, a flow rate of exhaust that flows into turbine 53, that is, a boost pressure of suctioned air, is regulated by controlling a position of waste gate valve 55. Exhaust that passes through turbine 53 or waste gate valve 55 is purified by a start catalyst converter 56 and an aftertreatment apparatus 57 provided at prescribed positions in exhaust passage 42, and thereafter emitted into the atmosphere. Start catalyst converter 56 and aftertreatment apparatus 57 contain, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start catalyst converter 56 and aftertreatment apparatus 57 to a portion of intake air passage 41 between compressor 48 and air flow meter 50.

<Configuration of Controller>

Figure 3:
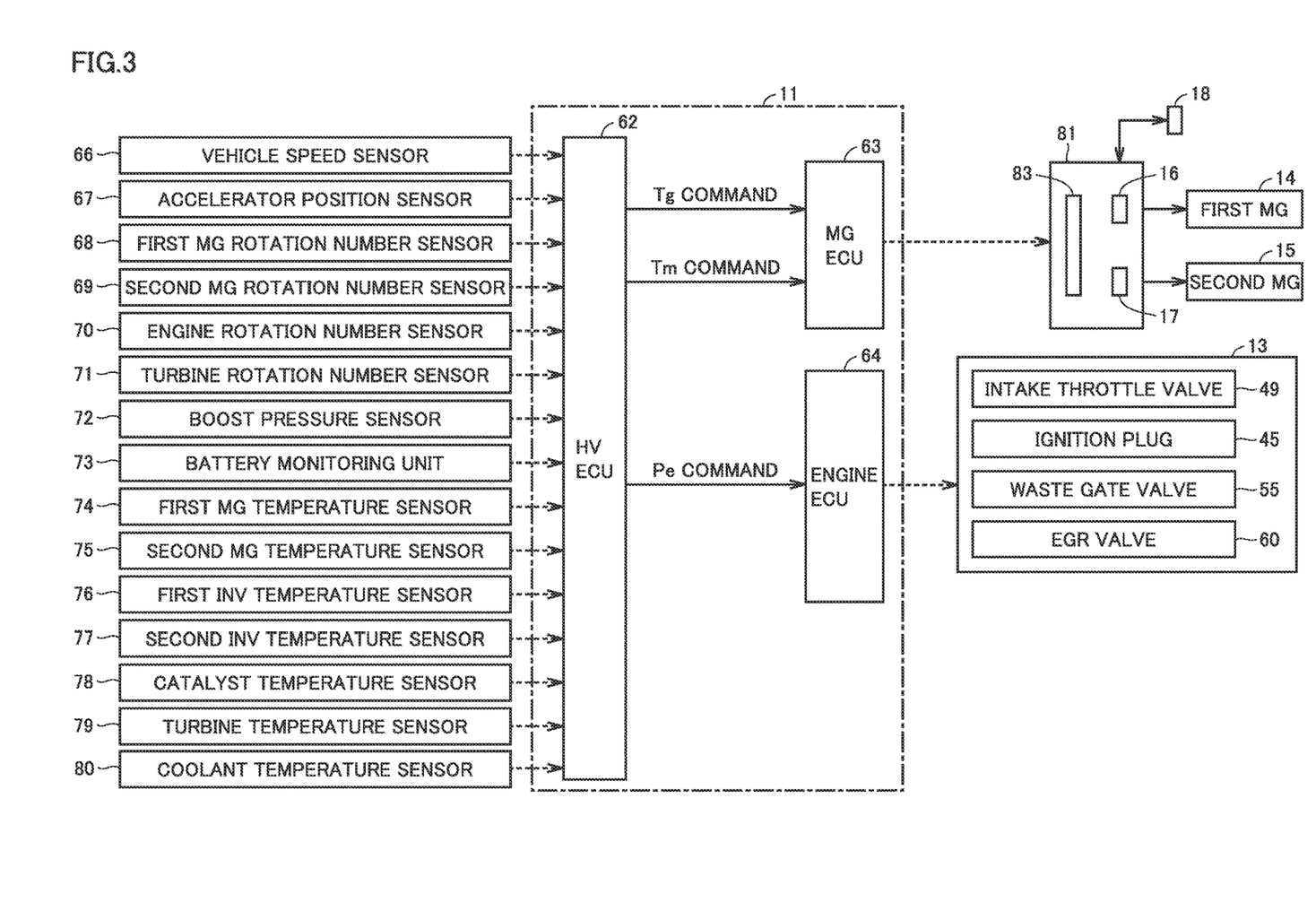
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that stores various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation number sensor 68, a second MG rotation number sensor 69, an engine rotation number sensor 70, a turbine rotation number sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, a turbine temperature sensor 79, and a coolant temperature sensor 80 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation number sensor 68 detects a rotation speed of first MG 14. Second MG rotation number sensor 69 detects a rotation speed of second MG 15. Engine rotation number sensor 70 detects a rotation speed of output shaft 22 of engine 13 (engine rotation speed). Turbine rotation number sensor 71 detects a rotation speed of turbine 53 of forced induction device 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Coolant temperature sensor 80 detects a temperature of coolant for engine 13. Various sensors output signals indicating results of detection to HV-ECU 62.

Battery monitoring unit 73 obtains a state of charge (SOC) representing a ratio of a remaining amount of charge to a full charge capacity of power storage 18 and outputs a signal indicating the obtained SOC to HV-ECU 62. Battery monitoring unit 73 includes, for example, a sensor that detects a current, a voltage, and a temperature of power storage 18. Battery monitoring unit 73 obtains an SOC by calculating the SOC based on the detected current, voltage, and temperature of power storage 18. Various known approaches such as an approach by accumulation of current values (coulomb counting) or an approach by estimation of an open circuit voltage (OCV) can be adopted as a method of calculating an SOC.

<Control of Running of Vehicle>

Vehicle 10 can be set or switched to an HV running mode in which engine 13 and second MG 15 serve as motive power sources and an EV running mode in which the vehicle runs with engine 13 remaining stopped and second MG 15 being driven by electric power in power storage 18. Mode setting and mode switching are made by HV-ECU 62. The EV running mode is selected, for example, in a low-load operation region where a vehicle speed is low and requested driving force is low, and in this mode, engine 13 is turned off and output torque of second MG 15 is used as a source of drive for running. The HV running mode is selected in a high-load operation region where a vehicle speed is high and requested driving force is high, and in this mode, combined torque of output torque of engine 13 and output torque of second MG 15 is used as a source of drive for running.

In the HV running mode, in transmitting torque output from engine 13 to drive wheel 24, first MG 14 applies reaction force to planetary gear mechanism 20. Therefore, sun gear S functions as a reaction force element. In other words, in order to apply output torque of engine 13 to drive wheel 24, first MG 14 is controlled to output reaction torque against output torque of engine 13. In this case, regenerative control in which first MG 14 functions as a generator can be carried out.

Specifically, HV-ECU 62 determines requested driving force based on an accelerator position determined by an amount of pressing of the accelerator pedal or a vehicle speed and calculates requested power of engine 13 based on the requested driving force. HV-ECU 62 outputs a command indicating power Pe to be generated by engine 13 (a Pe command) to engine ECU 64.

Engine ECU 64 variously controls each component of engine 13 such as intake throttle valve 49, ignition plug 45, waste gate valve 55, and EGR valve 60 based on the Pe command received from HV-ECU 62.

HV-ECU 62 determines based on calculated requested power, an operating point (the number of rotations and output torque) of engine 13 in a coordinate system defined by the number of rotations Ne of engine 13 and output torque Te of engine 13. HV-ECU 62 sets, for example, an intersection between an equal power line equal in output to requested power in the coordinate system and a predetermined operating line as the operating point of engine 13. The predetermined operating line represents a trace of variation in engine torque with variation in number of rotations Ne of engine 13 in the coordinate system, and it is set, for example, by adapting the trace of variation in output torque Te of engine 13 high in fuel efficiency through experiments. Output torque set by determination of the operating point, that is, output torque calculated based on requested power, is also referred to as "requested output torque Tec" below.

Torque and the number of rotations of first MG 14 are controlled such that engine 13 operates at the operating point. Torque and the number of rotations of first MG 14 can arbitrarily be controlled in accordance with a value of a fed current or a frequency thereof. In the HV running mode, HV-ECU 62 controls engine 13, first MG 14, and second MG 15 such that requested driving force determined in accordance with an accelerator position or a vehicle speed is output to output gear 21 (drive wheel 24).

HV-ECU 62 outputs a command indicating torque Tg to be generated by first MG 14 (a Tg command) and a command indicating torque Tm to be generated by second MG 15 (a Tm command) to MG-ECU 63.

MG-ECU 63 generates a signal for driving first MG 14 and second MG 15 based on the command received from HV-ECU 62 and outputs the signal to power control unit (PCU) 81.

When torque Te of engine 13 exceeds a prescribed level (a boost line) by pressing of the accelerator pedal, HV-ECU 62 requests forced induction by forced induction device 47 and requests increase in boost pressure with increase in torque Te. The request for forced induction and the request for increase in boost pressure are given to engine ECU 64 and engine ECU 64 controls waste gate valve 55 in a closing direction. When there is no request for forced induction, waste gate valve 55 is fully opened.

Though FIG. 3 illustrates an example in which HV-ECU 62, MG-ECU 63, and engine ECU 64 are implemented as individual ECUs, the ECUs may be integrated as a single ECU as appropriate.

<Controlled Upper Limit Torque and Threshold Output Torque>

Figure 4:
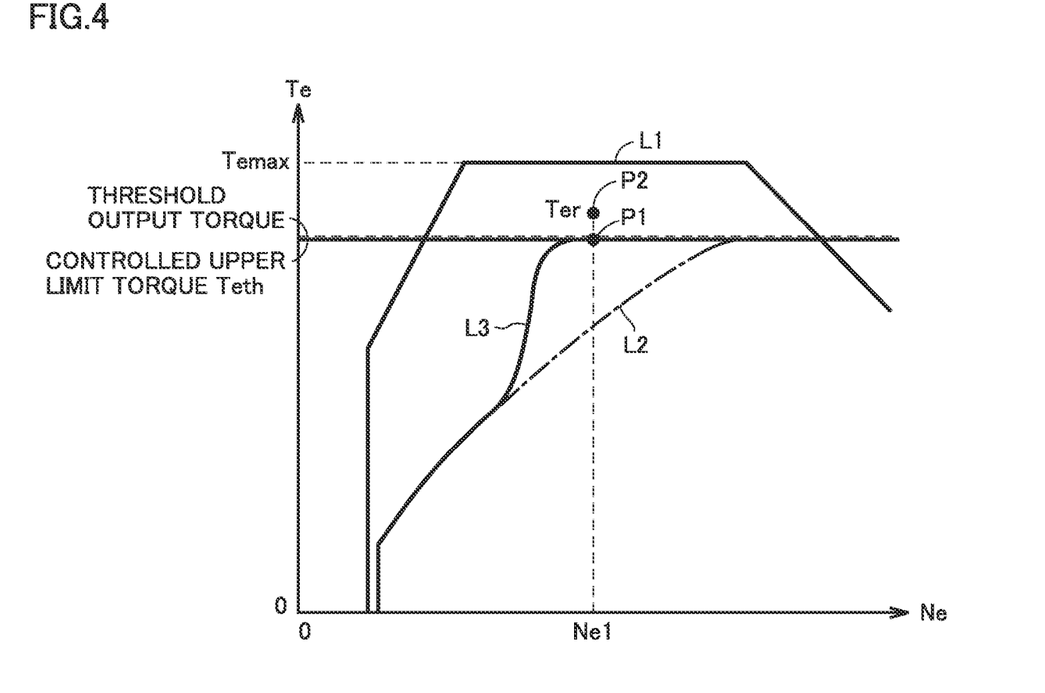
FIG. 4 is a diagram for illustrating an operating point of the engine.

FIG. 4 is a diagram for illustrating an operating point of engine 13. In FIG. 4, the ordinate represents torque Te of engine 13 and the abscissa represents the number of rotations Ne of engine 13.

Referring to FIG. 4, a solid line L1 represents maximum torque that can be output by engine 13. A dashed line L2 and a solid line L3 represent operating lines of engine 13. Engine 13 is controlled such that the operating point normally determined by torque Te and the number of rotations Ne moves over an operating line (dashed line L2 or solid line L3) set in advance. Dashed line L2 represents an operating line of engine 13 used when fuel efficiency is prioritized. Solid line L3 represents an operating line of engine 13 used when output from engine 13 is prioritized. For example, which of the operating lines represented by dashed line L2 and solid line L3 is to be used is determined by an amount of pressing of the accelerator pedal (a throttle opening angle). For example, when an amount of pressing of the accelerator is large, solid line L3 is adopted, and when an amount of pressing of the accelerator is small, dashed line L2 is adopted.

An upper limit for control purpose (controlled upper limit torque) Teth may be set for output torque of engine 13 so as not to cause over-rotation of first MG 14. For example, controlled upper limit torque Teth is set to a value smaller than maximum output torque Temax of engine 13 (Teth<Temax).

Figure 5:
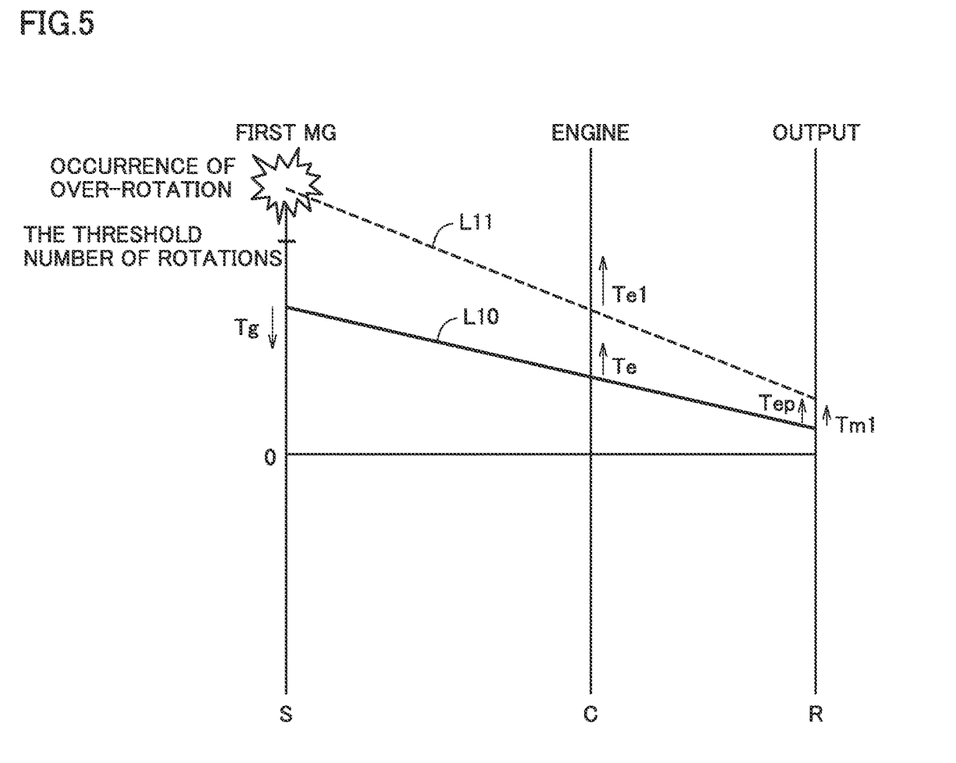
FIG. 5 is a nomographic chart showing relation of the numbers of rotations of the engine, a first MG, and an output element with torque.

FIG. 5 is a nomographic chart showing relation of the number of rotations of engine 13, first MG 14, and an output element with torque. Ring gear R coupled to countershaft 25 (FIG. 1) functions as the output element. A position on the ordinate represents the number of rotations of each element (engine 13, first MG 14, and the output element) and an interval on the ordinate represents a gear ratio of planetary gear mechanism 20. "Te" represents torque of engine 13 and "Tg" represents torque of first MG 14. "Tep" represents direct torque of engine 13 and "Tm1" represents torque obtained by conversion of torque Tm of second MG 15 into torque on the output element. The sum of Tep and Tm1 corresponds to torque output to countershaft 25 (and driveshafts 32 and 33). An upward arrow indicates torque in a positive direction, a downward arrow indicates torque in a negative direction, and a length of the arrow indicates magnitude of torque.

The threshold number of rotations for not causing over-rotation is set for first MG 14. A solid line L10 in FIG. 5 represents an example in which reaction torque for bearing output torque Te of engine 13 is equal to or smaller than maximum output torque of first MG 14. In this case, reaction torque Tg of first MG 14 can bear output torque Te of engine 13. A dashed line L11 represents an example in which reaction torque for bearing output torque Te1 of engine 13 is larger than maximum output torque of first MG 14. In this case, reaction torque Tg of first MG 14 cannot bear output torque Te1 of engine 13. Therefore, the number of rotations of first MG 14 may increase (that is, the rotation speed increases) and exceed the threshold number of rotations, and over-rotation may occur. In other words, when torque exceeding output torque (threshold output torque) of engine 13 corresponding to maximum output torque of first MG 14 is output from engine 13, over-rotation may occur in first MG 14.

Therefore, by setting controlled upper limit torque Teth described above to restrict the upper limit of output torque Te of engine 13 to controlled upper limit torque Teth, output torque Te of engine 13 is prevented from exceeding threshold output torque. When requested output torque Tec calculated based on requested power attains to controlled upper limit torque Teth, output torque Te of engine 13 is restricted to controlled upper limit torque Teth. Controlled upper limit torque Teth according to the first embodiment is set to a value equal to threshold output torque such that engine 13 can output high output torque when requested.

Referring again to FIG. 4, it is assumed that HV-ECU 62 has set an operating point P1 based on requested power in FIG. 4. In this case, HV-ECU 62 outputs a Pe command to engine ECU 64 with requested output torque Tec being set to controlled upper limit torque Teth and the number of rotations being set to Ne1. Namely, HV-ECU 62 outputs the Pe command (the number of rotations Ne and requested output torque Tec (=Teth)) to engine ECU 64. Engine ECU 64 controls each component of engine 13 so as to output controlled upper limit torque Teth.

Output torque Ter actually output from engine 13 (actual output torque), however, may unintentionally exceed controlled upper limit torque Teth due, for example, to an error in detection by various sensors or variation in operation among actuators (detection variation). A point P2 in FIG. 4 represents an actual operating point of engine 13. In the example shown in FIG. 4, actual output torque Ter exceeds controlled upper limit torque Teth and threshold output torque and may cause over-rotation of first MG 14.

In particular, there are a larger number of sensors and actuators in a hybrid vehicle than in a vehicle including only an engine as a motive power source. In hybrid vehicle 10 including engine 13 including forced induction device 47, there are further larger number of sensors and actuators, and accordingly detection variation may also become significant.

Controlled upper limit torque Teth may also be set with a margin being secured for threshold output torque. When low controlled upper limit torque Teth is set, however, output torque Te of engine 13 may excessively be restricted, which may affect running of vehicle 10 or drivability. In view of the above, it has been desired to appropriately set controlled upper limit torque Teth while moderately balancing between ability of output of high output torque when requested and prevention of over-rotation of first MG 14.

In vehicle 10 according to the first embodiment, controlled upper limit torque Teth in consideration of detection variation is set by performing learning processing for learning controlled upper limit torque Teth while an initial value of controlled upper limit torque Teth (for example, a value at the time of shipment of vehicle 10 from factories) is set to a value equal to threshold output torque. Learning refers to update of controlled upper limit torque Teth as appropriate based on a difference between output torque (controlled upper limit torque Teth) of engine 13 as a target value and actual output torque. Thus, controlled upper limit torque Teth can appropriately be set by learning while high output torque can be output from engine 13 when requested in the initial stage. The initial value of controlled upper limit torque Teth is not limited to a value exactly the same as threshold output torque and it may be set to a value slightly smaller than threshold output torque (a value around threshold output torque).

<Processing for Learning Controlled Upper Limit Torque>

Processing for learning controlled upper limit torque Teth will specifically be described. When requested output torque Tec calculated based on requested power attains to controlled upper limit torque Teth, HV-ECU 62 outputs a Pe command to engine ECU 64 with requested output torque Tec (=Teth) being set. If detection variation is assumed as zero, actual output torque Ter of engine 13 must be equal to controlled upper limit torque Teth (Ter=Teth). Actual output torque Ter that is actually output, however, may be larger than controlled upper limit torque Teth as shown in FIG. 4, due to detection variation.

In this case, HV-ECU 62 learns controlled upper limit torque Teth based on a difference between controlled upper limit torque Teth (point P1) and actual output torque Ter (point P2). In the example in FIG. 4, actual output torque Ter is larger than controlled upper limit torque Teth and hence controlled upper limit torque Teth is learned to decrease based on the difference between them. When actual output torque Ter is smaller than controlled upper limit torque Teth, controlled upper limit torque Teth is learned to increase based on the difference between them.

Various known methods can be employed as a learning method. For example, controlled upper limit torque Teth can be learned by weighting a difference between requested output torque Tec and actual output torque Ter. Exemplary learning processing will be described later with reference to FIG. 7.

For example, first MG 14 is used for calculating actual output torque Ter. Specifically, when reaction torque for bearing output torque Te of engine 13 is equal to or smaller than maximum output torque of first MG 14, actual output torque Ter of engine 13 is calculated based on output torque of first MG 14. When reaction torque for bearing output torque Te of engine 13 is larger than maximum output torque of first MG 14, actual output torque Ter of engine 13 cannot be calculated based on output torque (maximum output torque) of first MG 14 and therefore variation in rotation speed of first MG 14 is used. By finding in advance relation between variation in rotation speed while first MG 14 is outputting maximum output torque and output torque Te of engine 13, actual output torque Ter of engine 13 can be estimated from variation in rotation speed of first MG 14 while it is outputting maximum output torque.

<Processing Performed by Controller>

Figure 6:
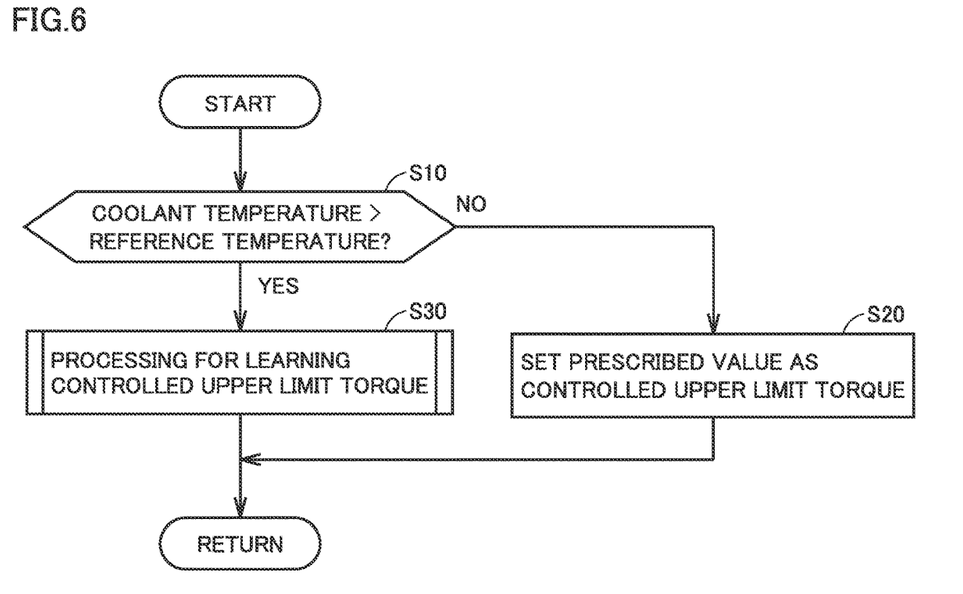
FIG. 6 is a flowchart showing a procedure in processing performed by the controller.

FIG. 6 is a flowchart showing a procedure in processing performed by controller 11. The flowchart is repeatedly performed by controller 11 every prescribed control period. Though an example in which steps (the step being abbreviated as "S" below) shown in FIGS. 7, 9, and 10 which will be described later are performed by software processing by controller 11 is described, some or all of the steps may be performed by hardware (electrical circuits) fabricated in controller 11.

In setting controlled upper limit torque Teth, HV-ECU 62 determines whether or not warm-up of engine 13 has been completed. Specifically, HV-ECU 62 obtains a temperature of coolant (not shown) for engine 13 and determines whether or not the obtained temperature of coolant is higher than a reference temperature (S10). When warm-up of engine 13 has not been completed, for example, output accuracy in outputting requested output torque Tec may lower. When warm-up of engine 13 has not been completed, detection variation may be greater than when warm-up of engine 13 has been completed. Therefore, depending on a value of requested output torque Tec, torque exceeding controlled upper limit torque Teth may be output due to lowering in output accuracy.

When the temperature of coolant is equal to or lower than the reference temperature (NO in S10), that is, when warm-up of engine 13 has not been completed, HV-ECU 62 sets controlled upper limit torque to a prescribed value (S20). The prescribed value is set to a value smaller than threshold output torque in consideration of detection variation before completion of warm-up of engine 13.

When the temperature of coolant is higher than the reference temperature (YES in S10), that is, when warm-up of engine 13 has been completed, HV-ECU 62 performs processing for learning controlled upper limit torque Teth (S30).

Figure 7:
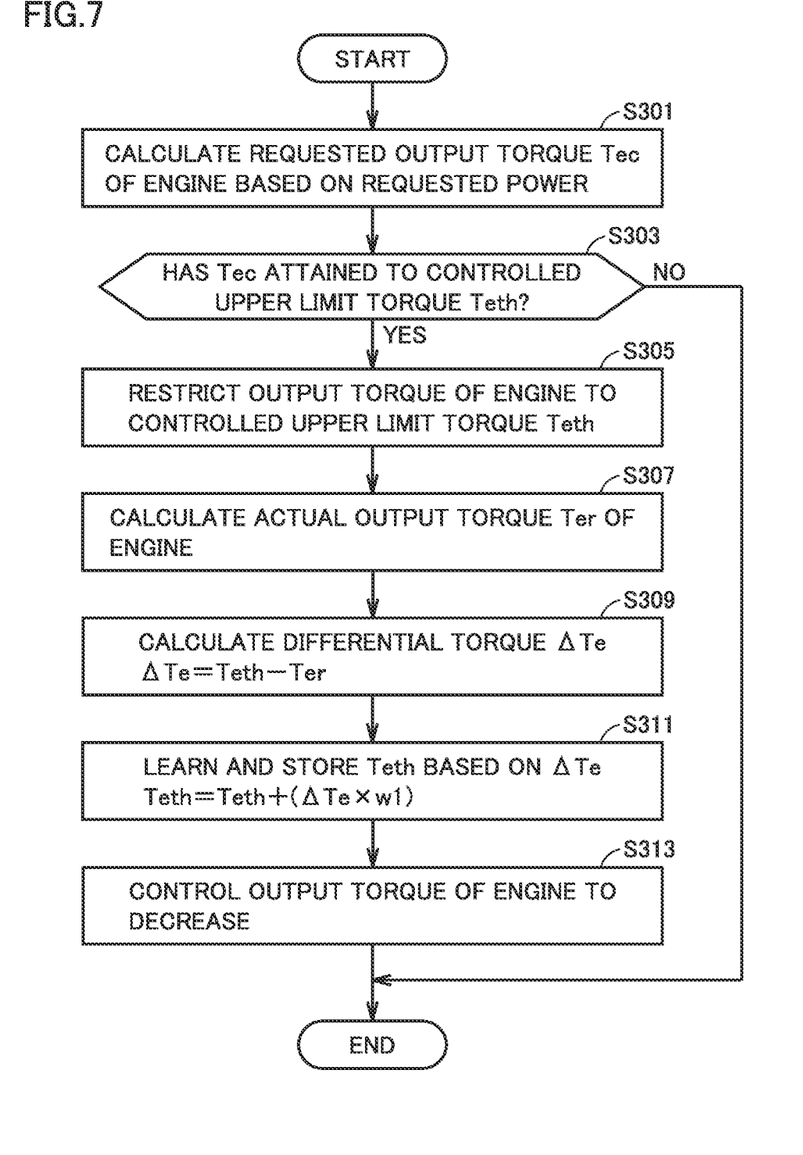
FIG. 7 is a flowchart showing a procedure in learning processing.

FIG. 7 is a flowchart showing a procedure in learning processing. HV-ECU 62 calculates requested output torque Tec of engine 13 based on requested power (S301).

HV-ECU 62 reads controlled upper limit torque Teth, for example, from the storage and compares requested output torque Tec calculated in S301 with controlled upper limit torque Teth (S303). When requested output torque Tec has not attained to controlled upper limit torque Teth (NO in S303), HV-ECU 62 quits the process.

When requested output torque Tec has attained to controlled upper limit torque Teth (YES in S303), HV-ECU 62 and engine ECU 64 restrict output torque of engine 13 to controlled upper limit torque Teth (S305). Specifically, HV-ECU 62 outputs a Pe command to engine ECU 64 with requested output torque Tec being set to a value of controlled upper limit torque Teth. Then, engine ECU 64 controls each component of engine 13 such that controlled upper limit torque Teth is output.

Then, HV-ECU 62 calculates actual output torque Ter of engine 13 (S307). Specifically, when reaction torque for bearing output torque Te of engine 13 is equal to or smaller than maximum output torque of first MG 14 as described above, HV-ECU 62 calculates actual output torque Ter of engine 13 based on output torque of first MG 14. When reaction torque for bearing output torque Te of engine 13 is larger than maximum output torque of first MG 14, HV-ECU 62 estimates actual output torque Ter of engine 13 from variation in rotation speed of first MG 14.

HV-ECU 62 calculates differential torque ΔTe representing a difference between controlled upper limit torque Teth representing output torque that must have been output by engine 13 and actual output torque Ter in accordance with an expression (1) below (S309).

$$\Delta Te = Teth - Ter \quad (1)$$

Then, HV-ECU 62 learns controlled upper limit torque Teth based on calculated differential torque ΔTe, in accordance with an expression (2) below (S311). A coefficient w1 is a weight coefficient and can be set as appropriate. Controlled upper limit torque Teth in consideration of detection variation is thus learned.

$$Teth = Teth + (\Delta Te \times w1) \quad (2)$$

Then, HV-ECU 62 has the storage store learned controlled upper limit torque Teth (S311).

Then, engine ECU 64 controls output torque of engine 13 to decrease (S313). Examples of control of output torque of engine 13 to decrease include control for retarding ignition of engine 13, timing control of a variable valve, control of a throttle valve, and control for cutting off fuel. By controlling output torque of engine 13 to decrease, output torque of engine 13 can be decreased to suppress occurrence of over-rotation of first MG 14 or to quickly suppress over-rotation.

As set forth above, when requested output torque Tec calculated based on requested power attains to controlled upper limit torque Teth, vehicle 10 according to the first embodiment restricts output torque of engine 13 to controlled upper limit torque Teth and calculates actual output torque Ter at that time. By calculating a difference (differential torque ΔTe) between controlled upper limit torque Teth (target value) and actual output torque Ter, deviation between the target value and actually output torque can be calculated. By learning controlled upper limit torque Teth based on differential torque ΔTe, controlled upper limit torque Teth in consideration of detection variation can appropriately be set.

By setting the initial value of controlled upper limit torque Teth to a value equal to threshold output torque (or a value around threshold output torque), high output torque can be output from engine 13 when requested also in the initial stage.

(First Modification)

In the first embodiment, the initial value of controlled upper limit torque Teth is set to a value equal to threshold output torque (or a value around threshold output torque). The initial value of controlled upper limit torque Teth, however, is not limited to a value equal to threshold output torque (or a value around threshold output torque). For example, the initial value of controlled upper limit torque Teth may be set to a value smaller than threshold output torque by a maximum value of assumed detection variation. In a first modification, an example in which the initial value of controlled upper limit torque Teth is set to a value smaller than threshold output torque by a maximum value of assumed detection variation and controlled upper limit torque Teth is learned to increase based on differential torque ΔTe will be described.

Figure 8:
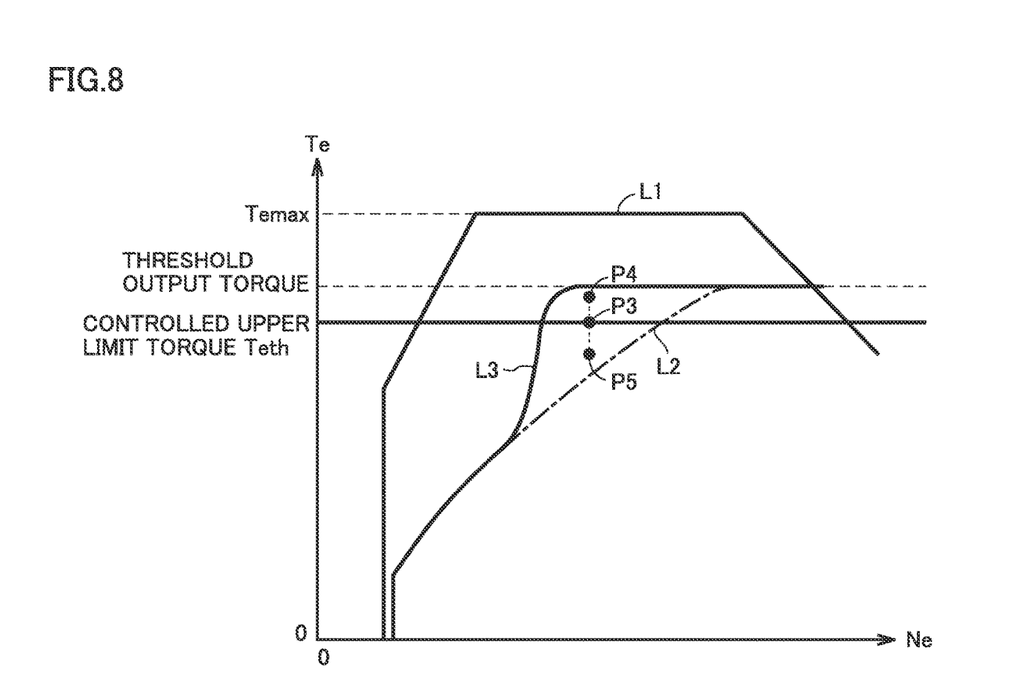
FIG. 8 is a diagram for illustrating an operating point of the engine according to a first modification.

FIG. 8 is a diagram for illustrating an operating point of engine 13 according to the first modification. In FIG. 8, the ordinate represents torque Te of engine 13 and the abscissa represents the number of rotations Ne of engine 13. Since solid line L1, dashed line L2, and solid line L3 are the same as in FIG. 4, description will not be repeated.

Controlled upper limit torque Teth is set to a value smaller than threshold output torque by a maximum value of assumed detection variation. HV-ECU 62 learns controlled upper limit torque Teth based on a difference between controlled upper limit torque Teth and actual output torque Ter. Specifically, when actual output torque Ter is larger than controlled upper limit torque Teth (when an actual operating point of engine 13 is located at a point P4), HV-ECU 62 learns controlled upper limit torque Teth based on a difference between them (that is, a difference between controlled upper limit torque Teth (a point P3) and actual output torque Ter (point P4), by using a coefficient w2, in accordance with an expression (3) below. Coefficient w2 is a weight coefficient and can be set as appropriate.

$$Teth = Teth + (|\Delta Te| \times w2) \quad (3)$$

When actual output torque Ter is smaller than controlled upper limit torque Teth (when an actual operating point of engine 13 is located at a point P5), HV-ECU 62 learns controlled upper limit torque Teth based on a difference between them (that is, a difference between controlled upper limit torque Teth (point P3) and actual output torque Ter (point P5), by using a coefficient w3 (>w2) larger than coefficient w2, in accordance with an expression (4) below. Coefficient w3 is a weight coefficient and can be set as appropriate.

$$Teth = Teth + (\Delta Te \times w3) \quad (4)$$

In any of the case that actual output torque Ter is larger than controlled upper limit torque Teth and the case that actual output torque Ter is smaller than controlled upper limit torque Teth, controlled upper limit torque Teth is learned to increase. When actual output torque Ter is smaller than controlled upper limit torque Teth, a weight coefficient larger than when actual output torque Ter is larger than controlled upper limit torque Teth is set so as to increase an increment of controlled upper limit torque Teth with respect to differential torque ΔTe. Controlled upper limit torque Teth can thus be learned based on a difference (differential torque ΔTe) between controlled upper limit torque Teth (target value) and actual output torque Ter, that is, deviation between the target value and actually output torque, and controlled upper limit torque Teth in consideration of detection variation can appropriately be set.

By setting the initial value of controlled upper limit torque Teth to a value smaller than threshold output torque by a maximum value of assumed detection variation, actual output torque Ter exceeding threshold output torque can be suppressed even though actual output torque Ter of engine 13 exceeds controlled upper limit torque Teth due to detection variation in the initial stage. Occurrence of over-rotation of first MG 14 can be suppressed.

Second Embodiment

In the first embodiment and the first modification, an example in which actual output torque Ter is prevented from exceeding threshold output torque due to detection variation by learning controlled upper limit torque Teth is described. In a second embodiment, an example in which actual output torque Ter is prevented from exceeding threshold output torque due to detection variation by learning differential torque $\Delta Te$ instead of learning controlled upper limit torque Teth will be described. Learning according to the second embodiment refers to update of differential torque $\Delta Te$ as appropriate based on a difference between output torque (controlled upper limit torque Teth) of engine 13 representing the target value and actual output torque.

Since the configuration of vehicle 10 is the same as in the first embodiment, description will not be repeated. Controlled upper limit torque Teth according to the second embodiment is set to a value equal to threshold output torque. When a temperature of coolant is equal to or lower than the reference temperature, that is, warm-up of engine 13 has not been completed, controlled upper limit torque is set to a prescribed value as in the first embodiment.

When requested output torque Tec calculated based on requested power has attained to controlled upper limit torque Teth, HV-ECU 62 restricts output torque Te of engine 13 to controlled upper limit torque Teth. In this case, HV-ECU 62 reads differential torque $\Delta Te$ from the storage. Differential torque $\Delta Te$ read here is differential torque $\Delta Te$ learned in previous learning as described below. HV-ECU 62 outputs to engine ECU 64 as an indication of requested output torque Tec, torque resulting from addition of differential torque $\Delta Te$ to controlled upper limit torque Teth in accordance with an expression (5) below.

$$Tec = Teth + \Delta Te \quad (5)$$

Engine ECU 64 controls each component of engine 13 such that requested output torque Tec in accordance with the indication received from HV-ECU 62 is output.

HV-ECU 62 then calculates actual output torque Ter. HV-ECU 62 calculates present differential torque $\Delta Te1$ in accordance with the expression (1) as in the first embodiment. Presently calculated differential torque is denoted as $\Delta Te1$.

HV-ECU 62 learns differential torque $\Delta Te$, for example, in accordance with an expression (6) below. A coefficient w4 is a weight coefficient and can be set as appropriate.

$$\Delta Te = \Delta Te + (\Delta Te1 \times w4) \quad (6)$$

HV-ECU 62 has the storage store learned differential torque $\Delta Te$. Presently learned differential torque $\Delta Te$ is used when HV-ECU 62 outputs a Pe command to engine ECU 64 next time.

Thus, for example, when actual output torque Ter is larger than controlled upper limit torque Teth representing the target value, that is, presently calculated differential torque $\Delta Te1$ is negative, a value of learned differential torque $\Delta Te$ is decreased. In other words, present variation in actual output torque Ter due to detection variation is reflected on differential torque $\Delta Te$, which is in turn reflected on a Pe command output from HV-ECU 62 to engine ECU 64 next time.

When actual output torque Ter is smaller than controlled upper limit torque Teth representing the target value, that is, presently calculated differential torque $\Delta Te1$ is positive, a value of learned differential torque $\Delta Te$ is increased, which is in turn reflected on a Pe command output from HV-ECU 62 to engine ECU 64 next time.

As set forth above, by learning differential torque $\Delta Te$ and varying requested output torque Tec in accordance with an indication output from HV-ECU 62 to engine ECU 64, variation in actual output torque Ter due to detection variation can be suppressed.

<Processing Performed by Controller>

Figure 9:
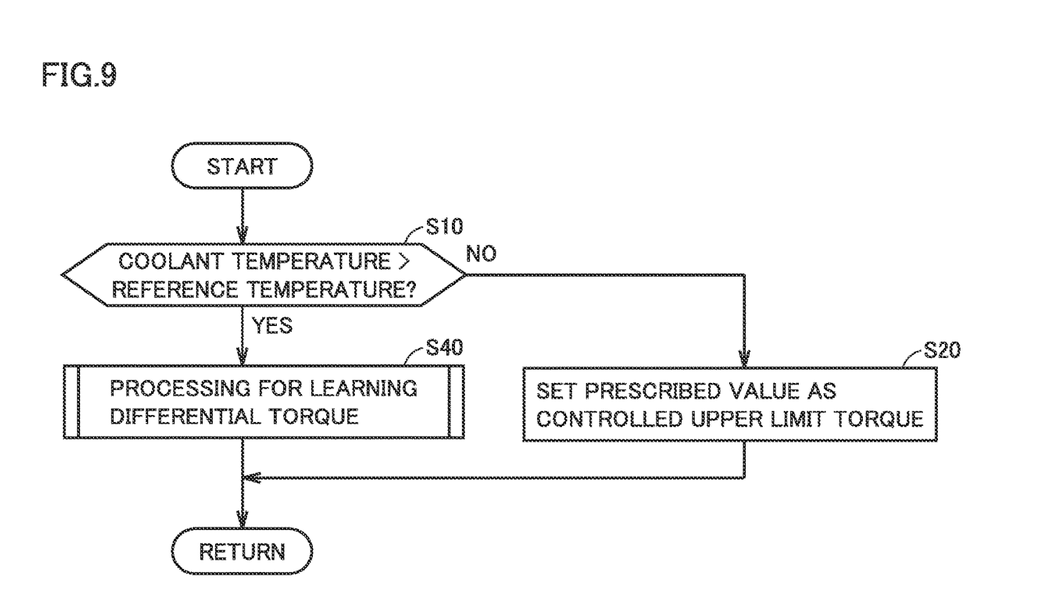
FIG. 9 is a flowchart showing a procedure in processing performed by the controller according to a second embodiment.

FIG. 9 is a flowchart showing a procedure in processing performed by controller 11 according to the second embodiment. The flowchart is repeatedly performed by controller 11 every prescribed control period. The flowchart in FIG. 9 is different from the flowchart in FIG. 6 in change of S30 to S40. Steps the same as in FIG. 6 have the same reference characters allotted and description will not be repeated.

When the temperature of coolant is higher than the reference temperature (YES in S10), that is, when warm-up of engine 13 has been completed, HV-ECU 62 performs processing for learning differential torque $\Delta Te$ (S40).

Figure 10:
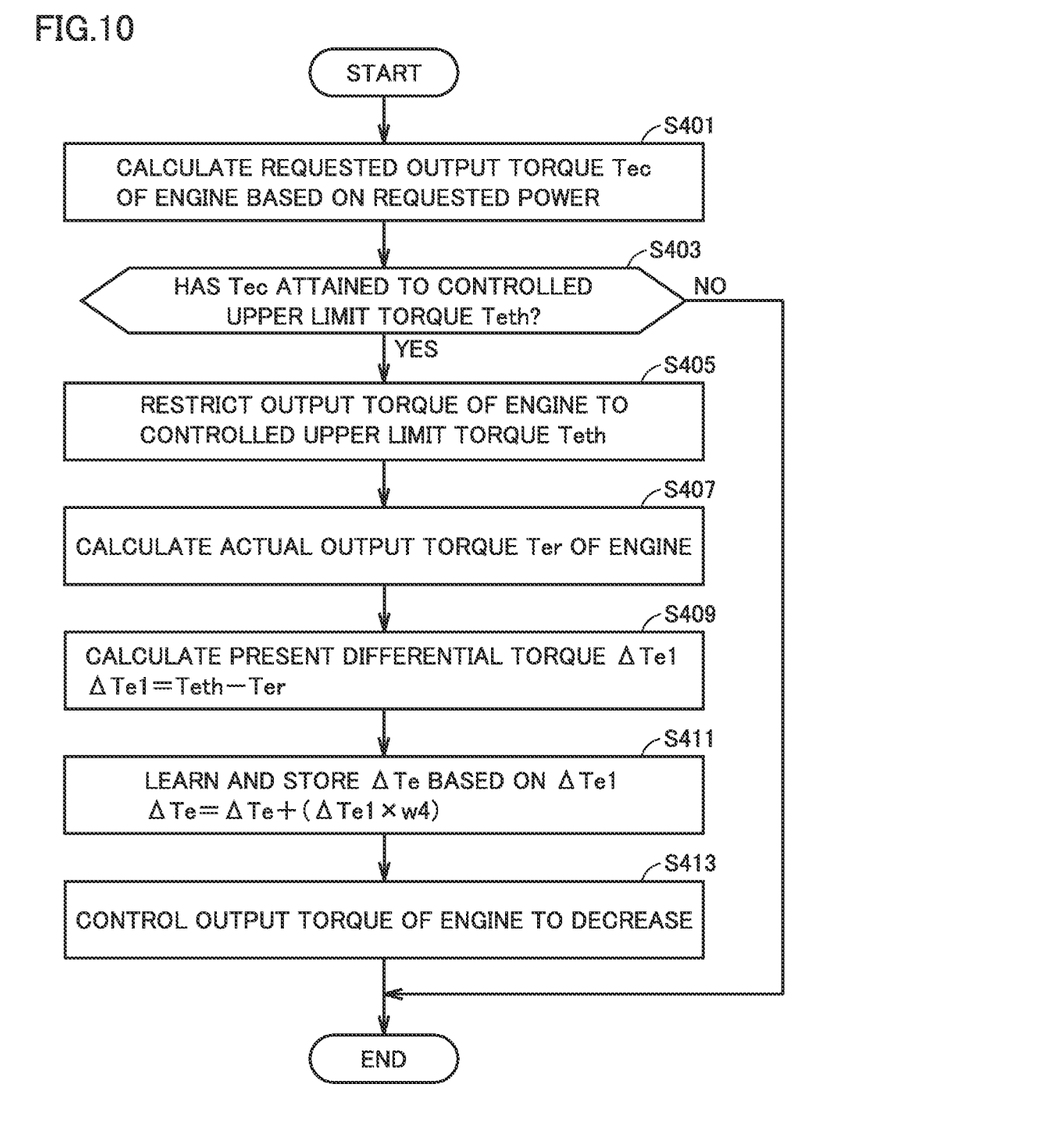
FIG. 10 is a flowchart showing a procedure in learning processing according to the second embodiment.

FIG. 10 is a flowchart showing a procedure in learning processing according to the second embodiment. HV-ECU 62 calculates requested output torque Tec based on requested power (S401).

HV-ECU 62 reads controlled upper limit torque Teth, for example, from the storage and compares requested output torque Tec calculated in S401 with controlled upper limit torque Teth (S403). When requested output torque Tec has not attained to controlled upper limit torque Teth (NO in S403), HV-ECU 62 quits the process. S403 corresponds to exemplary determination as to whether or not a "learning condition" according to the present disclosure is satisfied. In other words, requested output torque Tec having attained to controlled upper limit torque Teth corresponds to exemplary fulfillment of the learning condition.

When requested output torque Tec has attained to controlled upper limit torque Teth (YES in S403), HV-ECU 62 and engine ECU 64 restrict output torque of engine 13 to controlled upper limit torque Teth (S405). Specifically, HV-ECU 62 reads differential torque $\Delta Te$ from the storage. Differential torque $\Delta Te$ read here is differential torque $\Delta Te$ learned when the present flowchart was previously performed. HV-ECU 62 outputs to engine ECU 64 as requested output torque Tec, a result of addition of differential torque $\Delta Te$ to controlled upper limit torque Teth in accordance with the expression (5). Engine ECU 64 controls each component of engine 13 such that requested output torque Tec indicated by HV-ECU 62 is output.

Then, HV-ECU 62 calculates actual output torque Ter of engine 13 (S407). Specifically, when reaction torque for bearing output torque Te of engine 13 is equal to or smaller than maximum output torque of first MG 14 as described above, HV-ECU 62 calculates actual output torque Ter of engine 13 based on output torque of first MG 14. When reaction torque for bearing output torque Te of engine 13 is larger than maximum output torque of first MG 14, HV-ECU 62 estimates actual output torque Ter of engine 13 from variation in rotation speed of first MG 14.

HV-ECU 62 calculates present differential torque ΔTe1 representing a difference between controlled upper limit torque Teth representing output torque that must have been output by engine 13 and actual output torque Ter, in accordance with the expression (1) as in the first embodiment (S409).

HV-ECU 62 learns differential torque ΔTe based on present differential torque ΔTe1 calculated in S409, in accordance with the expression (6) (S411). Then, HV-ECU 62 has the storage store learned differential torque ΔTe.

Then, engine ECU 64 controls output torque of engine 13 to decrease (S413).

As set forth above, when requested output torque Tec calculated based on requested power has attained to controlled upper limit torque Teth, vehicle 10 according to the second embodiment restricts output torque of engine 13 to controlled upper limit torque Teth. In this case, HV-ECU 62 reads differential torque ΔTe from the storage and outputs to engine ECU 64 as requested output torque Tec, torque resulting from addition of differential torque ΔTe to controlled upper limit torque Teth.

Engine ECU 64 controls each component of engine 13 such that requested output torque Tec indicated by HV-ECU 62 is output, and HV-ECU 62 calculates actual output torque Ter at this time. The HV-ECU then calculates a difference (present differential torque ΔTe1) between controlled upper limit torque Teth (target value) and actual output torque and learns differential torque ΔTe based on present differential torque ΔTe1. Differential torque ΔTe is assumed to represent variation in actual output torque Ter due to detection variation.

When requested output torque Tec calculated based on requested power attains to controlled upper limit torque Teth next time, HV-ECU 62 outputs to engine ECU 64 as requested output torque Tec, torque resulting from addition of learned differential torque ΔTe to controlled upper limit torque Teth so that variation in actual output torque Ter due to detection variation can be suppressed.

(Second Modification)

In the second embodiment, an example in which differential torque ΔTe is learned and torque resulting from addition of learned differential torque ΔTe to controlled upper limit torque Teth is output as requested output torque Te from HV-ECU 62 to engine ECU 64 is described. In other words, in S405 in FIG. 10, HV-ECU 62 updates output torque Te of engine 13 in consideration of differential torque ΔTe. In S405 in FIG. 10, however, for example, HV-ECU 62 may learn differential torque ΔTe and output an indication of learned differential torque ΔTe together with a Pe command to engine ECU 64. Engine ECU 64 may update output torque Te of engine 13 based on the Pe command and learned differential torque ΔTe.

When requested output torque Tec calculated based on requested power has attained to controlled upper limit torque Teth, HV-ECU 62 reads differential torque ΔTe, for example, from the storage, and outputs to engine ECU 64, an indication of read differential torque ΔTe together with the Pe command with requested output torque Tec being set to controlled upper limit torque Teth. This differential torque ΔTe is differential torque ΔTe learned in previous learning in accordance with the expression (6) as described in the second embodiment.

Engine ECU 64 that has received the indication of requested output torque Tec and the indication of learned differential torque ΔTe calculates torque Te to be output, in accordance with an expression (7) below.

$$Te = Tec + \Delta Te \quad (7)$$

Engine ECU 64 variously controls each component of engine 13 such as intake throttle valve 49, ignition plug 45, waste gate valve 55, and EGR valve 60 based on calculated output torque Te. An effect as in the second embodiment can thus also be achieved.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
an internal combustion engine;
a rotating electric machine;
a planetary gear mechanism to which the internal combustion engine, the rotating electric machine, and an output shaft are connected; and
a controller that controls the internal combustion engine and the rotating electric machine, wherein
when requested output torque calculated based on requested power requested of the internal combustion engine has attained to controlled upper limit torque representing an upper limit for a purpose of control of output torque of the internal combustion engine, the controller
restricts output torque of the internal combustion engine to the controlled upper limit torque or smaller,
calculates actual output torque of the internal combustion engine based on output torque of the rotating electric machine or variation in rotation speed of the rotating electric machine, and
learns the controlled upper limit torque based on a difference between the controlled upper limit torque and the actual output torque.

2. The hybrid vehicle according to claim 1, wherein
when the actual output torque is larger than the controlled upper limit torque, the controller learns the controlled upper limit torque to decrease the controlled upper limit torque, and
when the actual output torque is smaller than the controlled upper limit torque, the controller learns the controlled upper limit torque to increase the controlled upper limit torque.

3. The hybrid vehicle according to claim 1, wherein
an initial value of the controlled upper limit torque is set to output torque of the internal combustion engine in accordance with maximum output torque of the rotating electric machine.

4. The hybrid vehicle according to claim 1, wherein
when the actual output torque exceeds output torque corresponding to maximum output torque of the rotating electric machine, the controller controls output torque of the internal combustion engine to decrease.

5. The hybrid vehicle according to claim 1, wherein
the internal combustion engine includes a forced induction device.

6. The hybrid vehicle according to claim 1, wherein
when a temperature of cooling water for the internal combustion engine is lower than a reference temperature, the controller sets the controlled upper limit torque to a prescribed value smaller than output torque in accordance with maximum output torque of the rotating electric machine.

7. A hybrid vehicle comprising:
an internal combustion engine;
a rotating electric machine;
a planetary gear mechanism to which the internal combustion engine, the rotating electric machine, and an output shaft are connected; and
a controller that controls the internal combustion engine and the rotating electric machine, wherein
when a learning condition is satisfied, the learning condition being a condition that requested output torque calculated based on requested power requested of the internal combustion engine has attained to controlled upper limit torque representing an upper limit for a purpose of control of output torque of the internal combustion engine, the controller
   restricts output torque of the internal combustion engine to the controlled upper limit torque or smaller, and
   calculates actual output torque of the internal combustion engine based on output torque of the rotating electric machine or variation in rotation speed of the rotating electric machine and learns a difference between the controlled upper limit torque and the actual output torque, and
when the learning condition is satisfied next time, the controller controls output torque of the internal combustion engine based on the learned difference.

\* \* \* \* \*